H. G. VOIGHT.
MOLDER'S FLASK.
APPLICATION FILED APR. 17, 1909.
981,723.
Patented Jan. 17, 1911.
6 SHEETS—SHEET 1.
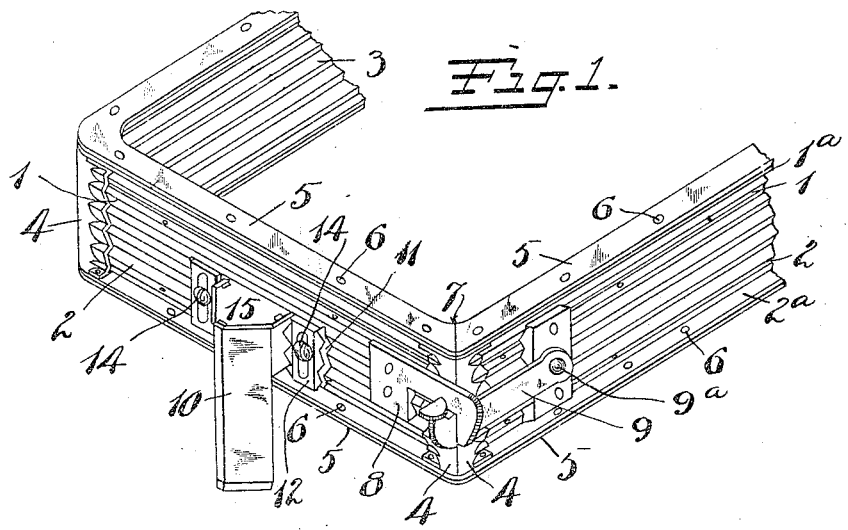
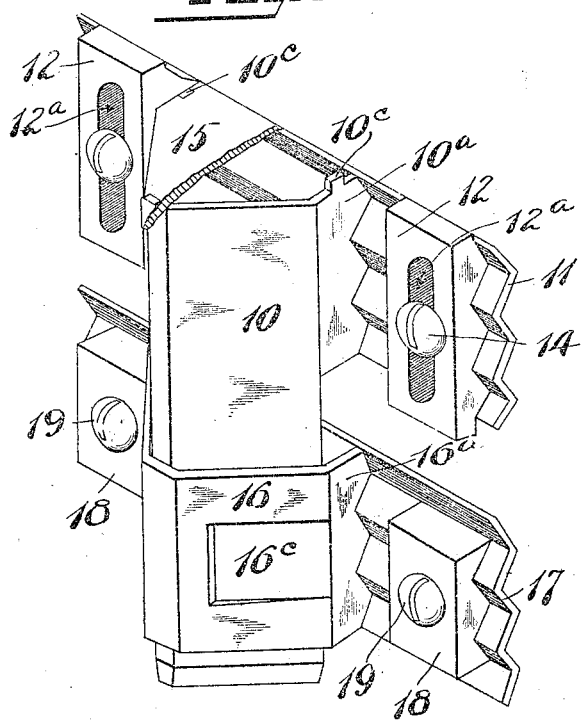
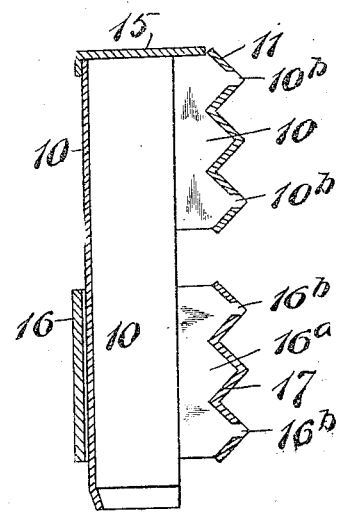
Witnesses:
Inventor
H. G. Voight
By his Attorneys

H. G. VOIGHT.
MOLDER'S FLASK.
APPLICATION FILED APR. 17, 1909.

981,723.

Patented Jan. 17, 1911.
6 SHEETS—SHEET 2.

Witnesses:

Inventor
H. G. Voight
By his Attorneys

H. G. VOIGHT.
MOLDER'S FLASK.
APPLICATION FILED APR. 17, 1909.

981,723.

Patented Jan. 17, 1911

6 SHEETS—SHEET 3

Witnesses:

Inventor
H. G. Voight
By his Attorneys

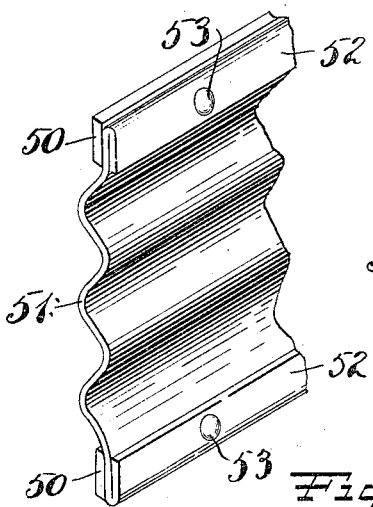
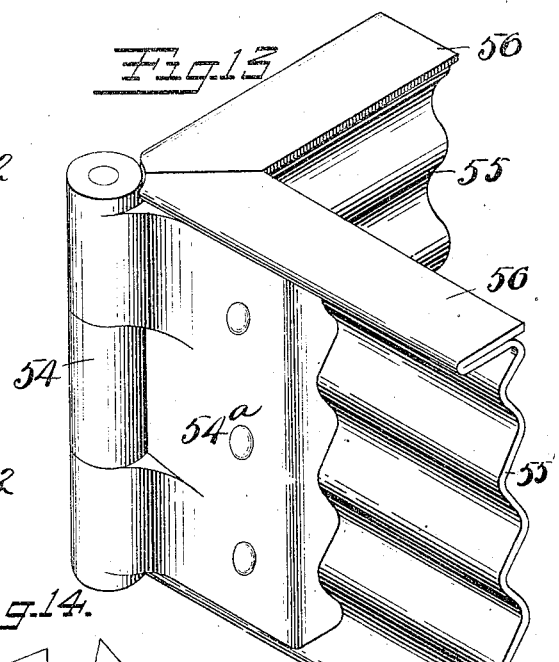
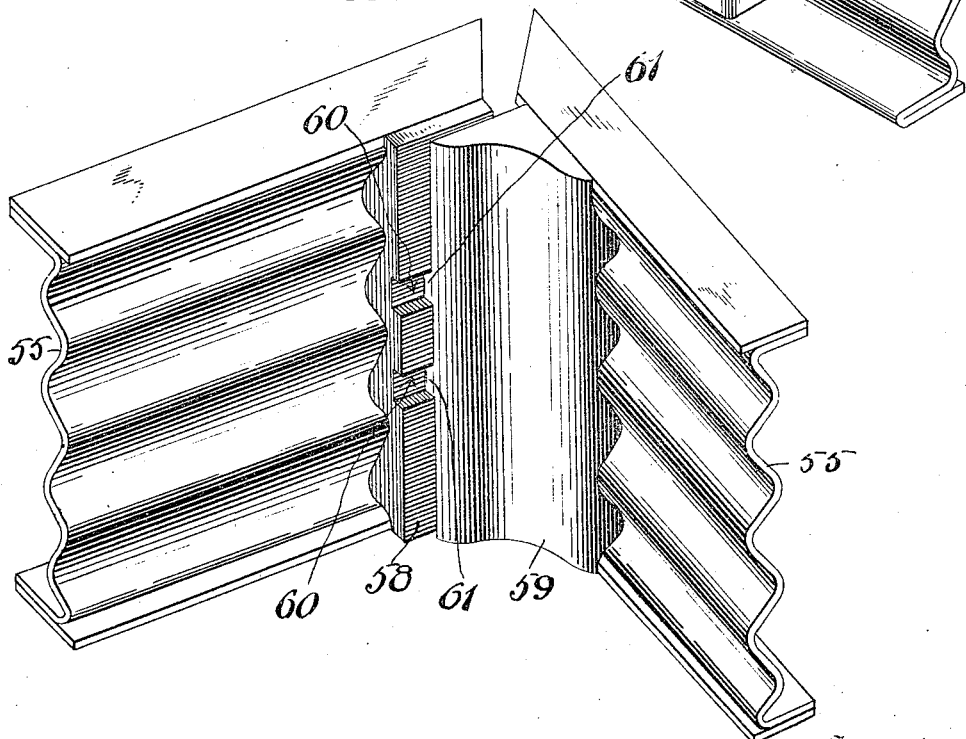

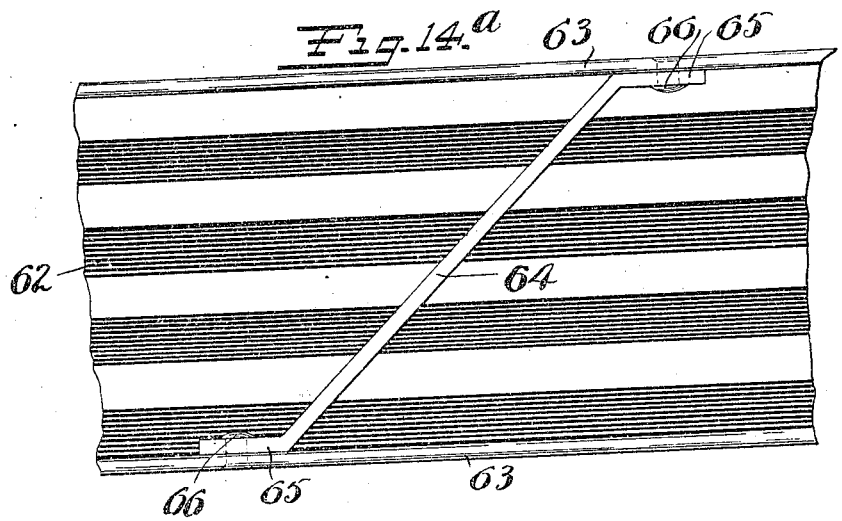
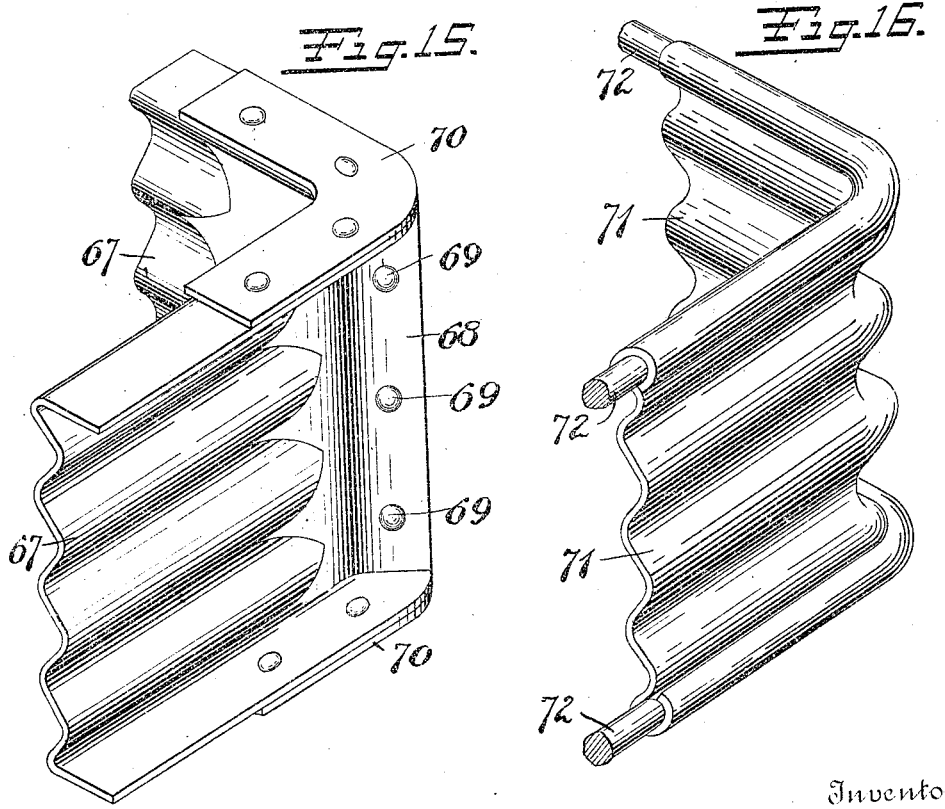
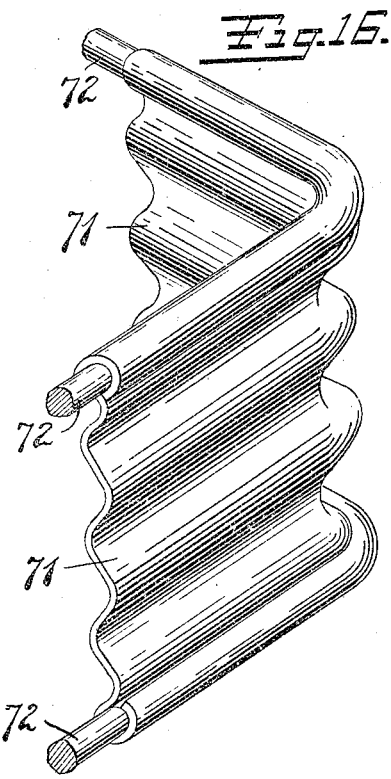

H. G. VOIGHT.
MOLDER'S FLASK.
APPLICATION FILED APR. 17, 1909.
981,723.
Patented Jan. 17, 1911.
6 SHEETS—SHEET 6.
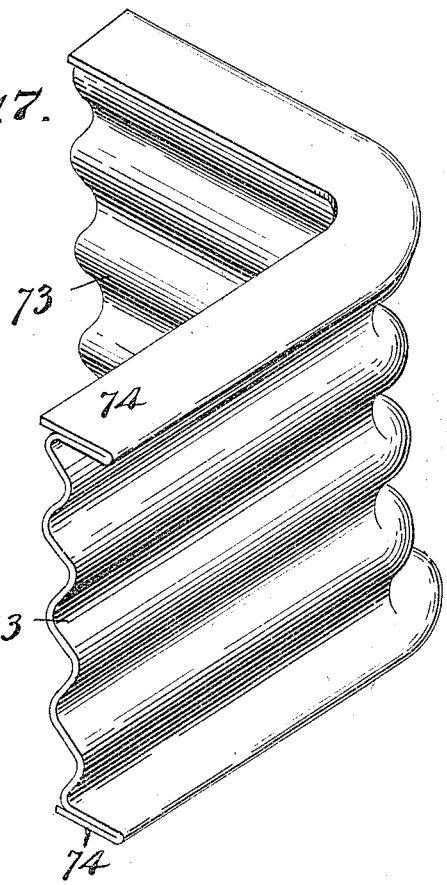
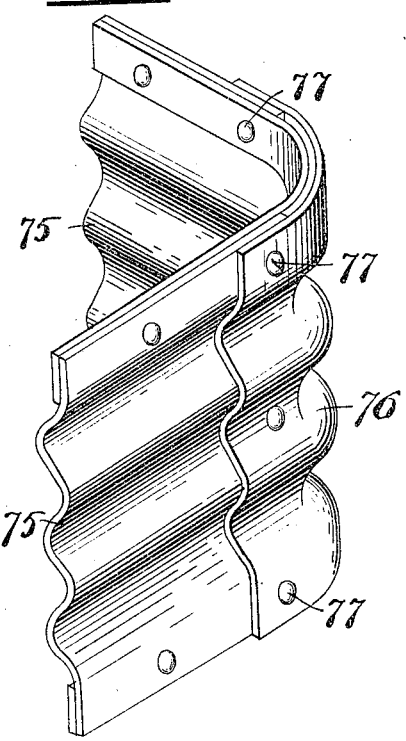
Witnesses:
Inventor
H. G. VOIGHT
By his Attorneys

UNITED STATES PATENT OFFICE.

HENRY G. VOIGHT, OF NEW BRITAIN, CONNECTICUT.

MOLDER'S FLASK.

981,723.  Specification of Letters Patent.  Patented Jan. 17, 1911.

Application filed April 17, 1909. Serial No. 490,624.

*To all whom it may concern:*

Be it known that I, HENRY G. VOIGHT, a citizen of the United States, residing at New Britain, Hartford county, Connecticut, have invented certain new and useful Improvements in Molders' Flasks, of which the following is a full, clear, and exact description.

My invention relates to improvements in molders' flasks of the "cope" and "nowel" type, and more particularly to "snap flasks", so-called. These devices comprise two companion upper and lower sections termed respectively the "cope" and the "nowel".
With these sections top and bottom boards are used, but since these boards constitute no part of this invention, they need not be shown or described.

The object of my invention is to provide a simple, exceedingly durable and effective construction, aiming at economy of manufacture and maximum serviceability. The construction also has the advantage of lightness, strength and comparative inexpensiveness.

Figure 4:
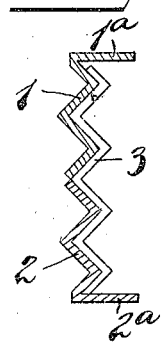
Figure 5:
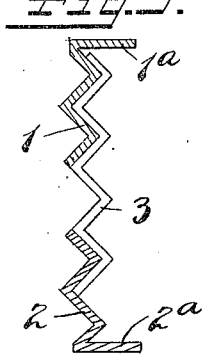
Figure 6:
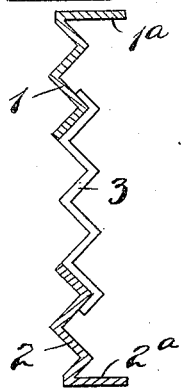
Figure 7:
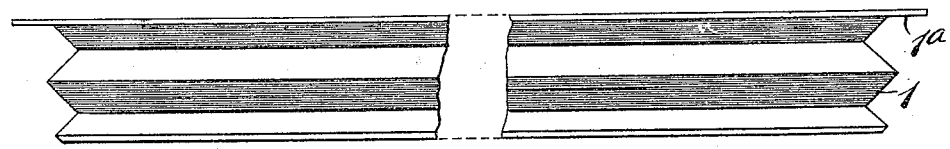
Figure 8:
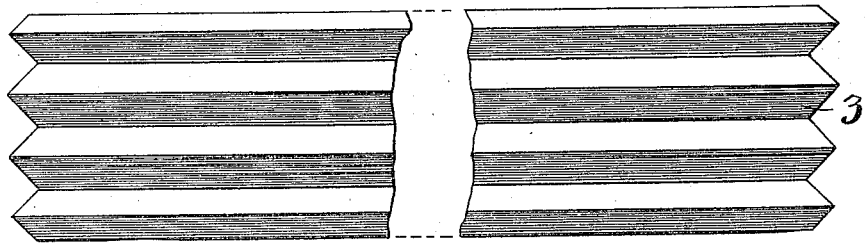
Figure 9:
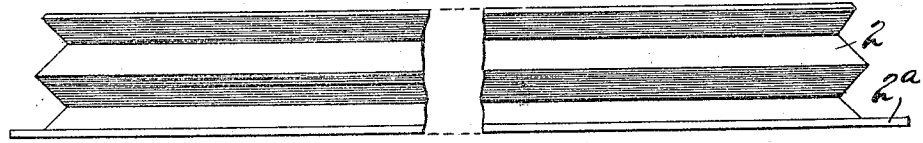
Figure 10:
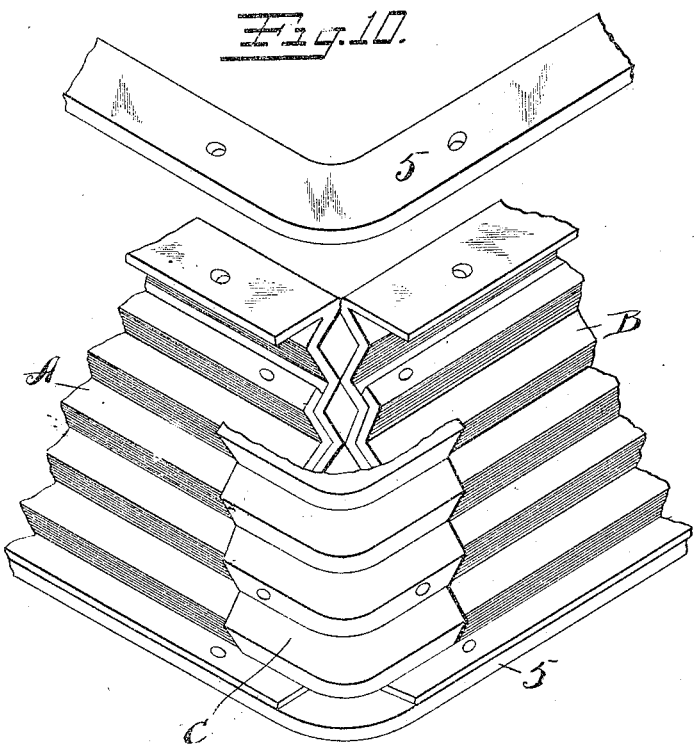
Figure 11:
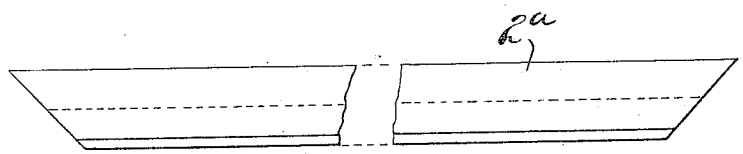

In the drawings: Figure 1 is a perspective view of one section (in this instance the "cope") of a snap flask (partly broken away) and constructed to embody my invention in a preferred form. Fig. 2 is a relatively enlarged detail view of a guide-pin and socket for the "cope" and "nowel". Fig. 3 is a vertical cross-section of Fig. 2. Figs. 4, 5 and 6 are respectively sectional views of the same parts showing three different positions of adjustment. Figs. 7, 8 and 9 are respectively side elevations of the parts shown in Figs. 4, 5 and 6, said parts being separated and broken away at the center. Fig. 10 is a perspective view of one corner of one section of the flask illustrating details of construction and a slightly modified method of connecting the corner connections as compared with that illustrated in Fig. 1. Fig. 11 is a view of the under side of the part shown in Fig. 9. Fig. 12 is a detailed view of a modified construction. Fig. 13 is a detailed view of one corner of the flask showing a hinge connection.
Fig. 14 is a view of the diagonally opposite corner of the flask from that shown in Fig. 13. Fig. 14ª is a detail of a side and edge reinforcement. Fig. 15 is a modified view of a corner construction. Figs. 16, 17 and 18 are detailed views of various modified edge and corner reinforcements.

Since the "cope" and "nowel" sections of the flask correspond substantially in construction, detail description of one section is sufficient for a full understanding of my invention. One of these sections carries a socket and the other a coacting guide-pin whereby in use said "cope" and "nowel" may be held together in proper operative relation.

Both sections of the flask are made from sheet or wrought metal, and each section preferably comprises a plurality of overlapping plates constituting the side walls. In the drawings I have shown the side walls as composed of three plates, to wit, an upper plate 1, a lower plate 2, and an intermediate plate 3 (see Figs. 4 to 9). These plates are correspondingly grooved or corrugated longitudinally on their abutting surfaces, so that said corrugations will register or interlock one with another when the parts are placed together. By means of these corresponding corrugations, the manufacturer may make each of these three parts of standard size, and by giving a proper pitch or spacing to the grooves or corrugations, may assemble the same so as to provide (with one standard set of plates) a flask section of several different sizes. For example, as shown in Fig. 4, the minimum size or depth is provided. In this figure, it will be observed that the two edges of the parts 1—2 practically abut. In Fig. 5 they are spaced apart the width of one corrugation, increasing the depth of said flask section to a corresponding extent. In Fig. 6 the two edges of the parts 1—2 are spaced apart the width of two corrugations, furnishing a flask section of correspondingly greater depth. It should not be assumed that these variations in size are accomplished by the user (the molder) but they are rather an important and valuable expedient of the manufacturer, who, in making said flasks, may, by the adoption of this standard arrangement of parts, readily produce flasks of different dimensions. These sections 1, 2 and 3 are secured together at the corners, which corners may be and preferably are suitably mitered, and around which corners reinforcements 4 are secured, these corner reinforcements being suitably shaped to close the corners of each flask section to prevent leakage.

5—5 are top and bottom plates, which are secured respectively to a top flange 1ª of each part 1 and the flange 2ª of each part 2.

All the parts may be secured together by any suitable fastenings, such as rivets 6—6. Each flask section is preferably divided at two opposite corners, one line of division being indicated at 7, Fig. 1. 8—9 are interlocking devices provided for the divided corners, in this particular instance the interlocking device 8 being in the form of a hook rigidly secured to one side of the flask section, while 9 represents a manually operable hook pivotally connected at 9ª to the adjacent side of the flask section, said hooks 8 and 9 coöperating to interlock and hold the two sections of the flask in proper operative relation for use. Suitable bearing reinforcements will be, of course, provided to support the hooks 8 and 9, these being rigidly secured to the sections of the flask which respectively carries said parts. It may be assumed that the flask section shown in Fig. 1 is the cope, and to that end, following the usual practice, a guide-pin is provided on this part. The guide-pin is of novel construction in that it, like the preceding parts, may be formed of sheet metal of a proper gage to withstand the strain of use and wear and tear. This guide-pin is indicated at 10 and is struck up from wrought metal in such a manner that its rear side appears as channeled, each side edge of each guide-pin being turned back, as at 10ª, and cut along its edge to conform to the corrugated walls of a back-plate 11. The corrugations of the back-plate 11 preferably correspond to the corrugations in the side wall of the nowel section, so as to permit said part to be effectively secured thereto. In the preferred construction, the back-plate 11 of the guide-pin is provided at its front side with reinforcements 12—12, each of which are slotted at 12ª, said slots passing through the back-plate to receive an attaching screw bolt 14, which passes through a suitable opening or perforation in the side wall of the cope where said guide-pin is to be secured. By providing a slotted bolt passage for each guide-pin fastening bolt, the guide-pin 10 may be readily adjusted up or down. The guide-pin construction is shown on a relatively enlarged scale in Figs. 2 and 3 and the method fastening the guide pin to the back-plate 11 is best seen in Fig. 3, in which it will be seen the rear edge of the portion 10ª of each guide-pin is provided with integral rivet extensions 10ᵇ—10ᵇ which are passed through perforations in the back-plate 11 and are upset or riveted over to rigidly and permanently secure the pin 10 to the back-plate 11. The top of the guide-pin may be closed in by a plate 15 secured by integral rivets 10ᶜ formed at the upper edge of the parts 10.

The nowel section, which, as already explained, may correspond to the cope section already described, is provided with a suitable socket to receive the guide-pin 10. The socket construction is best seen in Figs. 2 and 3, and may comprise an angular struck-up wrought metal portion 16 channeled at its back to embrace the guide-pin 10, and having turned-back rear edges 16ª secured by integral extensions 16ᵇ to a back-plate 17, corresponding in function to the back-plate 11 of the guide-pin. This back-plate may have reinforcements 18—18 perforated or slotted and designed to receive screw bolts or other equivalent fastenings 19, whereby said back-plate and the socket proper 16 may be secured to the nowel section.

16ᶜ is a friction spring, which may be struck in from the side of the socket 16 to frictionally press against the guide-pin 10 when contained therein, to hold said parts snugly in frictional contact.

In Fig. 10, I have shown a slightly modified form of corner reinforcement. In this view, it will be seen that the ends of the side pieces A—B of the flask section are not mitered, but are squared off, while the corner reinforcement C is corrugated throughout, said corrugations corresponding with the corrugations in the side sections A—B to register and interlock with the same. These parts C are riveted thereto so as to make a permanent rigid structure. This figure will serve merely to illustrate that I comprehend that various modifications may be made in the construction without departing from the spirit and scope of the invention, said figure illustrating only one of the many modifications that may be adopted.

In manufacture, it will be seen that many economies are attained, since by the production of sets of standard parts the manufacturer may, without additional cost, produce a line of flasks of varying sizes and yet of comparatively the same minimum weight. By the employment of corrugated metal two advantageous ends are attained, to wit, great strength at a minimum of weight and expense, and a capacity for original adjustment to various standard sizes.

In use, the advantage of lightness and great strength and durability are conspicuous. Again, in use the corrugated walls of the flask sections permit the sand to be packed in in such a manner as to interlock in the corrugations, thereby more firmly holding it in place than in the case of a plain flat sided wall against which the sand must adhere rather than interlock. Again, in use, the danger of injury to the flask by coming in contact with molten metal is eliminated. Again, the structure is so rigid and firm that the danger of warping is avoided. Inasmuch as devices of this kind are subjected to the most severe uses, being flung about the foundry, resistance to injury from this cause is another advantage strikingly characteristic of the construction desired.

So far as the use of the terms "cope" and "nowel" are employed in the specification or claims, it should be understood that said terms are used interchangeably, for I appreciate that to a very substantial extent the advantages of my invention might be obtained if either one of said sections were constructed in accordance with my invention and the other section constructed in a different manner. Hence, in order to secure adequate protection, it should be understood that from the standpoint of construction, a claim which refers to the construction of the "cope" is intended to cover and dominate similar construction employed in the "nowel".

In the foregoing respects a detailed description of my invention as disclosed herein will be found in my former application, Serial No. 468,854, and to the extent that this case may contain claims predicated upon what is also disclosed in my companion application, the present case may be considered as a division.

In Fig. 12 I have shown a modification in which the plates 50—50 reinforce the upper and lower edge of the side 51 of the flask. This side 51 may be made integrally as shown in Fig. 12 or sectionally as shown in Figs. 4 to 6. The plates 50—50 instead of being placed horizontally in this case are placed vertically and the extreme edges of the sides 51 may be rolled over as shown at 52 for the purpose of giving added strength. The reinforcing strips 50 may be secured in place by means of rivets 53.

In Fig. 13 I have shown a hinge 54 which serves to connect the two sides 55—55 of the flask at the corner opposite to the corner illustrated in the foreground of Fig. 1. In this instance, it will be observed that the edges of each side are rolled back to form an integral reinforcing plate 56 at each edge, corresponding in function to the plate 5, shown in Fig. 1. The hinge leaves 54ª are preferably corrugated to fit into the corrugations of the adjacent plates 55 to increase the efficiency of the connection between the parts 54 and 55.

In Fig. 14, I have illustrated that corner of the flask wherein the division occurs when the flask is to be opened and I have shown an improved corner reinforcement and closure which when the flask is closed serves to stiffen the parts and also to prevent leakage of sand. In this figure, 55—55 are the sides of the flask. 58—59 are two corner interlocking members, the former having grooves 60 or equivalent means for receiving tenons 61—61 carried by the reinforce 59. These parts serve to interlock the corner of the flask diagonally opposite to the hinge connection 54 to prevent vertical displacement, said parts also coöperating to prevent leakage of sand at that point, which is a matter of very great importance. It should be understood, of course, that a suitable latch mechanism arranged externally of the flask is also provided (though not seen in Fig. 14) to lock the parts together ready for use.

In Fig. 14ª I have shown a side and edge reinforcement. In this figure 62 represents one side of the flask with the horizontally flanged edges 63—63. These edges are suitably connected by a brace 64, having feet 65—65 secured by rivets 66—66 to the flanged edges 63 of the side 62. These members are arranged on the side upon which the flanges 63 are formed and are of great utility in the large size flasks in that they serve to strengthen the edges and support the intermediate sides.

In Fig. 15, 67—67 represent the sides of the flask having corresponding integrally flanged corner extensions 68, one of which only is seen in Fig. 15. These internal flanged extensions are arranged at the corners of the flask and may be securely connected by means of rivets or other suitable fastenings 69. If desired, an abbreviated edge and corner reinforcing plate 70 may be added at each corner, which corner reinforcement may be extended to semi-rectangular or full rectangular form, the semi-rectangular form being provided where the flask is divisible, as in Fig. 1; the full rectangular form being employed where the flask is rigid.

In Fig. 16, I have shown two sides 71—71 integrally connected at the corner, said sides being preferably provided with suitable horizontally arranged stiffening corrugations to prevent expansion when the sand is forced into the flask. In this view I have shown reinforcing wires 72—72 at each edge, said reinforcements being inclosed within a roll of the material forming the sides 71—71.

In Fig. 17, I have shown the sides 73—73 connected at the corners, as shown in Fig. 16, and instead of providing reinforcing wires or rods at each edge, I have provided flattened integral reinforcements 74—74, which give great strength and rigidity to the edges of the flask and which coöperate with the corrugations when present to prevent expansion.

In Fig. 18, I have shown a construction in some respects similar to Fig. 12. In Fig. 18, 75—75 represent the sides which are not integrally united, as shown in Fig. 17, but which are provided with a curved corner piece struck up from wrought metal and indicated at 76. This corner piece is secured by means of rivets 77 to the sides 75—75.

From the foregoing, it will be seen that in many respects my improved flask construction furnishes a light, yet strong and durable, and comparatively inexpensive article which possesses all and more advantages than will be found in any of the wood or cast-iron flasks now generally employed, said flask being vastly cheaper and more durable than the former and being cheaper and more resistant to hard and severe usage than the latter. This flask may be constructed without sacrifice of strength so as to be considerably lighter than either of the forms heretofore referred to and which are well known. It should be understood that the various forms of edge reinforcements and details of construction may be employed with the flask where the sides are formed of one piece or of the built-up construction, shown in Figs. 1 to 12. Also where the flask is of the snap flask type or the rigid type. So also in a snap flask, the construction of each section may involve two integrally connected sides or two sides connected rigidly at their respective corners by such means as illustrated in Fig. 18.

It should be understood that a shield member corresponding generally to the shield member 59 may be employed at the hinged corner of the flask to prevent the escape of sand.

What I claim is:

1. In a flask, wrought metal side members, reinforcing means for the edges of said side members, a cross brace extending from one reinforced edge of said flask to the other reinforced edge thereof.

2. In a snap flask, a flask member, two angular wrought metal sections each section forming one half of said flask member, a hinge connection for one end of each section operating to form one corner of the flask, a mechanical connection for the opposite end of each section operating with the hinge to connect the two sections of the flask, with means to reinforce said corner against vertical displacement of either side relatively to the other.

3. In a snap flask of rectangular form, two separable sections divided diagonally, a hinge operatively connecting both sections at one corner, interlocking means at the opposite corner and a shield member at the corner diagonally opposite to the hinge arranged to prevent the escape of sand, said shield member having a shoulder arranged to interlock with the opposite part when the flask is closed.

4. In a snap flask of rectangular form, two separable sections divided diagonally, a hinge operatively connecting both sections at one corner, interlocking means at the opposite corner and a shield member at the corner diagonally opposite to the hinge arranged to prevent the escape of sand, said shield member being arranged inside of the flask said shield member having a shoulder arranged to interlock with the opposite part when the flask is closed.

5. In a snap flask of rectangular form, two separable sections divided diagonally, a hinge operatively connecting both sections at one corner, interlocking means at the opposite corner, a shield member at the corner diagonally opposite to the hinge arranged to prevent the escape of sand, said shield member being arranged inside of the flask, said shield member coöperating with the interlocking device to prevent the longitudinal displacement of either side of the separable corner.

6. In a molder's flask of the cope and nowel type, one section thereof being formed in wrought metal comprising a plurality of sides arranged at an angle relatively to each other, means for connecting said sides at one or more corners of said section, longitudinally arranged corrugations in one or more of the sides, and having separate strengthening means attached to the upper and lower edge of each side, said flask section being divided at two points, a hinge at one point of division, and interlocking means at the other point of division.

HENRY G. VOIGHT.

Witnesses:
R. C. MITCHELL,
LILLIAN S. JAMES.